March 16, 1954 J. E. BOUGHTWOOD 2,672,517

PULSE MODULATION PHASING

Filed April 17, 1951 5 Sheets-Sheet 1

FIG. I

INVENTOR.
J. E. BOUGHTWOOD

BY M. J. Reynolds
ATTORNEY

*INVENTOR.*
J. E. BOUGHTWOOD

*BY*

M. J. Reynolds
ATTORNEY

INVENTOR.
J. E. BOUGHTWOOD
BY
M. J. Reynolds
ATTORNEY

March 16, 1954 J. E. BOUGHTWOOD 2,672,517

PULSE MODULATION PHASING

Filed April 17, 1951 5 Sheets-Sheet 4

INVENTOR.
J. E. BOUGHTWOOD

BY

M. J. Reynolds
ATTORNEY

INVENTOR.
J. E. BOUGHTWOOD

BY M. J. Reynolds

ATTORNEY

Patented Mar. 16, 1954 2,672,517

UNITED STATES PATENT OFFICE 2,672,517

PULSE MODULATION PHASING

John E. Boughtwood, Halesite, N. Y., assignor to The Western Union Telegraph Company, New York, N. Y., a corporation of New York Application April 17, 1951, Serial No. 221,469

9 Claims. (Cl. 179—15)

The present invention relates to pulse modulation systems and more particularly to the phasing of the transmitting and receiving distributors thereof.

In pulse modulation systems in which intelligence signals from a plurality of transmitting channels are selectively transmitted over a transmission system to a like plurality of receiving channels by allocation of transmitting time to the respective channels, it is necessary that corresponding transmitting and receiving channels be coupled to the transmission system at the proper times. If such phasing is not effected, intelligence signals intended for a particular receiving channel will be applied to a different receiving channel. Furthermore, once phasing is effected, it must be maintained. When the transmission system employed is a radio link, fading of signals is a possible cause of loss of phasing. Phasing may also be lost for other reasons, such as momentary power failures. It is therefore desirable that the phasing means employed respond rapidly to a loss of phasing and that failure to maintain phasing produces an alarm indication to operating personnel.

It is an object of the invention to provide phasing means for a pulse modulation system.

More particularly, it is an object of the invention to provide simple, reliable, and fast-acting phasing means for a pulse modulation system.

Another object of the invention is to provide phasing means for a pulse modulation system in which failure to maintain phasing produces an alarm indication to operating personnel.

Further objects of the invention will appear from the following description.

According to the invention, these objects are achieved in a multi-channel pulse modulation system by adding a characteristic frequency signal to the intelligence signal of a selected transmitting channel, providing an automatic stepper at the receiving terminal for periodically giving the receiving distributor an extra operation, and providing means responsive to the presence of the characteristic frequency signal in the receiving channel corresponding to the selected transmitting channel for disabling the automatic stepper and an alarm circuit.

The invention will now be described in greater detail with reference to the appended drawing in which.

Figure 1:
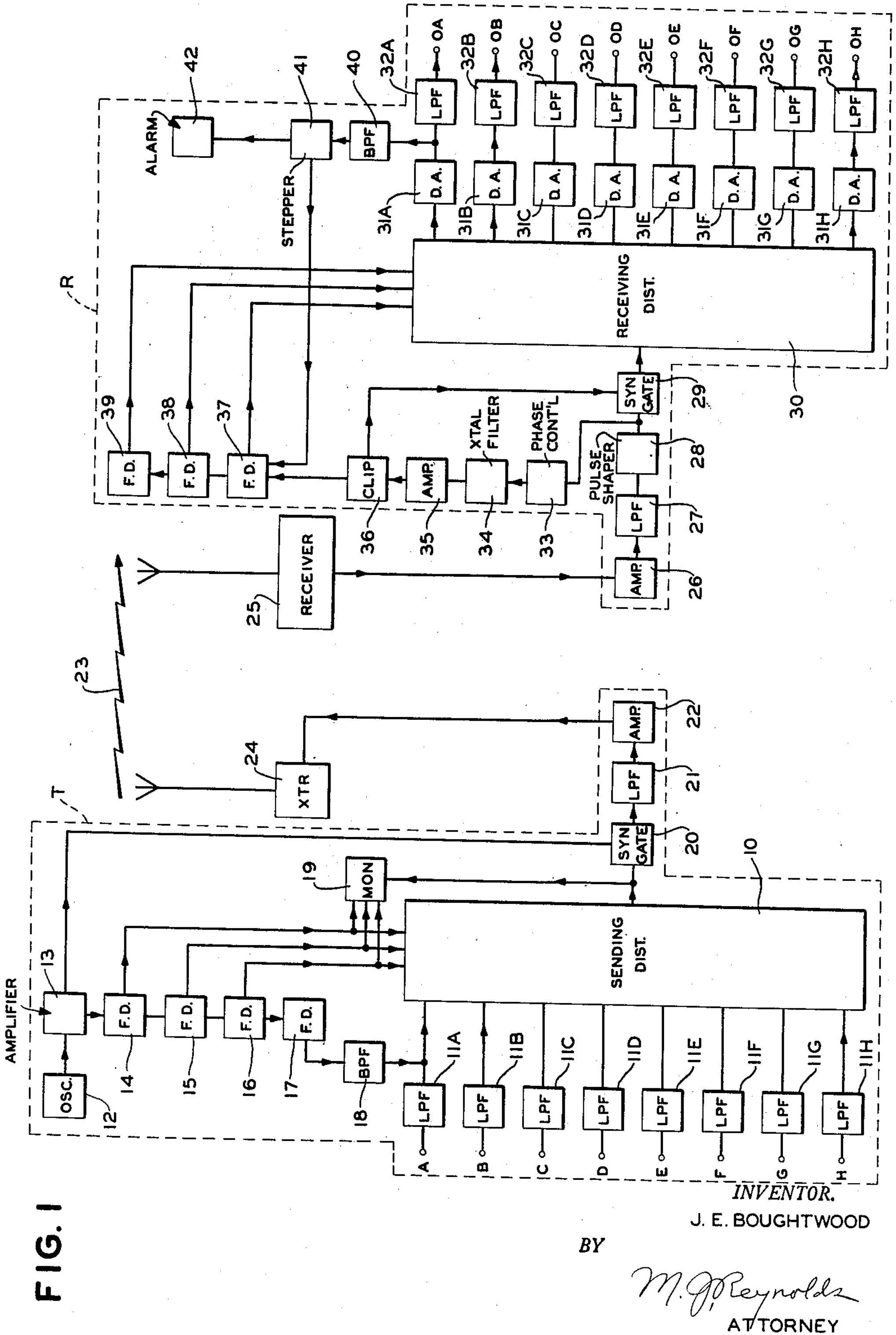
Fig. 1 is a block diagram of a pulse amplitude modulation system embodying the invention.

Referring now to the drawing and more particularly to Fig. 1, there is shown in block form a transmitting station T and a receiving station R for a pulse amplitude modulation system. Intelligence signals from eight sending voice frequency channels are applied, respectively, to input terminals A, B, C, D, E, F, G and H. Each of the input terminals A through H are coupled to a sending distributor 10 through respective low pass filters 11A through 11H. Low pass filter 11A through 11H are designed to cut off frequencies above the desired voice frequency intelligence signals. Sending distributor 10 will be described more fully in connection with Fig. 2.

A local oscillator 12 generates a relatively high frequency control signal which is amplified by amplifier 13, the output of which is applied to cascade connected frequency dividers 14, 15, 16 and 17. Oscillator 12, amplifier 13 and frequency dividers 14, 15, 16 and 17 may be of any conventional types designed to give relatively stable outputs. Suitable frequency divider circuits will be described in connection with Figs. 6 and 7.

For purposes of illustration only, various frequency values will be assumed for oscillator 12 and the frequency dividers. While these frequencies will be used in explaining the operation of the system, it is to be understood that other frequencies could equally well be chosen.

Oscillator 12 may be chosen to provide a 64 kc. voltage, while frequency dividers 14, 15, 16 and 17 provide, respectively, 32, 16, 8 and 4 kc. voltages. The 4 kc. output of frequency divider 17 is passed through a band pass filter 18 and combined with the output of low pass filter 11A. With the frequency values assumed, the highest signal frequency to be passed through filter 11A should be well below 4 kc., for instance, in the neighborhood of 3.3 kc. The outputs of frequency dividers 14, 15 and 16 are applied, in a manner to be described hereinafter, to sending distributor 10 and to a monitor 19.

Sending distributor 10 serves to sample, at a given rate, the respective signals applied to terminals A through H. The output of distributor 10 is applied to a synchronous gate 20 and to monitor 19. Synchronous gate 20, which will also be described in detail hereinafter, operates under control of a 64 kc. voltage from amplifier 13. The output of synchronous gate 20 is passed through a low pass filter 21 and applied to an amplifier 22. Filter 21 is designed as a low pass filter to provide attenuation for frequencies higher than 64 kc. The output of amplifier 22 is applied to a transmission medium 23. Transmission medium 23 might be a wire line or, as indicated in Fig. 1, a radio link employing a transmitter 24 and a receiver 25.

The output of receiver 25 is applied to an amplifier 26, the output of which is passed through a low pass filter 27, similar to filter 21. The output of filter 27 is applied to a pulse shaper 28, some of the details of which are described in connection with Figs. 6 and 7 and which is fully disclosed in my copending application Serial No. 221,470, filed concurrently herewith. Pulse shaper 28 is coupled to a synchronous gate 29, similar to gate 20. The output of gate 29 is applied to a receiving distributor 30, the operation of which corresponds to the operation of distributor 10.

Receiving distributor 30, the operation of which is synchronized and phased with the operation of sending distributor 10 in a manner to be described hereinafter, separates the signal samples taken by distributor 10 and applies them to appropriate detector amplifiers 31A through 31H. The outputs of amplifiers 31A through 31H are passed through low pass filters 32A through 32H, respectively, and applied to channel output terminals OA through OH, respectively.

The output of pulse shaper 28 is also applied to a phase control circuit 33, the output of which is, in turn, applied to a crystal filter 34 tuned to 64 kc. The output of filter 34 is amplified in a tuned amplifier 35 and applied to a tuned clipper circuit 36. Phase control circuit 33, filter 34, amplifier 35 and clipper 36 will be described in detail in connection with Figs. 6 and 7. The 64 kc. output of clipper 36 is applied to synchronous gate 29 and to a frequency divider 37, which provides a 32 kc. voltage. Frequency dividers 38 and 39, are coupled in cascade with divider 37 to provide, respectively, voltages of 16 and 8 kc. The outputs of dividers 37, 38 and 39 are applied to receiving distributor 30.

A 4 kc. characteristic frequency or phasing signal, which was applied to the output of low pass filter 11A and which should be present in the output of amplifier 31A, is derived therefrom through a band pass filter 40 coupled to the output of amplifier 31A. Filter 40 should have a very narrow pass band centered about 4 kc. The output of filter 40 is applied to a stepper 41, the operation of which will be described in detail hereinafter in connection with Figs. 6 and 7. Stepper 41 is coupled to frequency divider 37 and to an alarm 42.

When the system of Fig. 1 is properly phased, the input signals to transmitting channels A through H will appear, respectively, in receiving channels OA through OH. Similarly, the 4 kc. phasing signal added to transmitting channel A will be applied to band pass filter 40. If, however, the system is not phased, the signals present in the receiving channels will not be the signals from the corresponding transmitting channels. Similarly, the 4 kc. phasing signal will not be present in receiving channel OA and will not be applied to filter 40.

Stepper 41 is arranged to cause receiving distributor 30 periodically to advance a channel. Within a maximum of seven advances, the 4 kc. phasing signal will appear in channel OA and will, therefore, be applied to filter 40. When the 4 kc. phasing signal is present in the output of filter 40, it disables stepper 41 so that receiving distributor 30 will operate normally. If for any reason phasing should be lost, stepper 41 will again cause distributor 30 to advance periodically until proper phasing is restored.

Operation of stepper 41 also actuates an alarm 42, which might be a light, buzzer or other indicator, to indicate lack of proper phasing to operating personnel.

Sending distributor 10 is operated by voltages of fixed frequency derived from a common oscillator 12. The 64 kc. oscillations from oscillator 12 also operate synchronous gate 20, so that the same 64 kc. oscillations will be present in the transmitted signal. It is this same 64 kc. oscillation which is separated from the received signal in receiver station R to operate frequency dividers 37, 38 and 39. Since receiving distributor 30 is operated by the outputs of dividers 37, 38 and 39, receiving distributor 30 will operate at the same rate as sending distributor 10 and will be properly synchronized therewith.

The distributor operation will now be described with reference to Figs. 2 and 3 which illustrate distributor operation for two channels, A and E, of Fig. 1.

A source 12 of a 64 kc. square wave is coupled in cascade with frequency dividers 14, 15 and 16 providing, respectively, square wave outputs of 32, 16 and 8 kc. Each of dividers 14, 15 and 16 has two outputs, the two outputs of a given divider being 180° out of phase. The two 32 kc. outputs are denoted A$\phi$ and B$\phi$, the 16 kc. outputs are denoted as A'$\phi$ and B'$\phi$, and the 8 kc. outputs are denoted A$\phi$ and B$\phi$, the 16 kc. outthe distributor is intended to operate on a binary code and since eight channels are to be sampled, a 3 unit code is required to give eight combinations. The output square waves of dividers 14, 15 and 16 are illustrated in Fig. 3, where the letters A through H designate the portions of the time cycle devoted to each of the eight channels A through H. The period of one cycle of the 8 kc. square wave is equal to the time required for sampling the intelligence of all eight channels.

The distributor comprises an amplifier tube V for each channel. In Fig. 2, amplifier tubes V*a* and V*e* are illustrated, these tubes having their control grids coupled to channels A and E, respectively. The cathodes of amplifier tubes V*a* and V*e* are coupled to ground through biasing resistors R*a* and R*e*, respectively. The anodes of amplifier tubes V*a* and V*e* are interconnected by a conductor 50 and coupled to a source of positive potential through a resistor 51.

Three keying tubes are provided for each channel. Keying tubes V*a*32, V*a*16 and V*a*8 operate in conjunction with tube V*a*, while keying tubes V*e*32, V*e*16 and V*e*8 operate in conjunction with tube V*e*. The cathodes of tubes V*a*32, V*a*16 and V*a*8 are connected to the cathode of tube V*a*, while the cathodes of tubes V*e*32, V*e*16 and V*e*8 are connected to the cathode of tube V*e*. The anodes of all the keying tubes are connected together and to a source of positive potential. When one of the keying tubes conducts, the voltage drop produced across the cathode biasing resistor of its associated amplifier tube is sufficient to cut off the associated amplifier tube.

The control grids of the keying tubes are coupled to the respective square wave outputs in the following manner:

| | |
|---|---|
| Va32 | Aφ |
| Va16 | A'φ |
| Va8 | A''φ |
| Ve32 | Aφ |
| Ve16 | A'φ |
| Ve8 | B''φ |

Only when all three keying tubes for a given channel are rendered non-conductive by the square wave outputs will the associated amplifier tube conduct. Therefore tube Va will conduct only when square waves Aφ, A'φ and A''φ are all negative. An examination of Fig. 3 shows that this occurs only during the first half cycle of the Aφ wave. Therefore the intelligence signal from channel A will be transmitted only during the first one-eighth cycle of the 8 kc. square wave. Similarly, tube Ve will only conduct when square waves Aφ, A'φ and B''φ are all negative, which interval corresponds to the fifth one-eighth cycle of the 8 kc. square wave.

Figure 3:
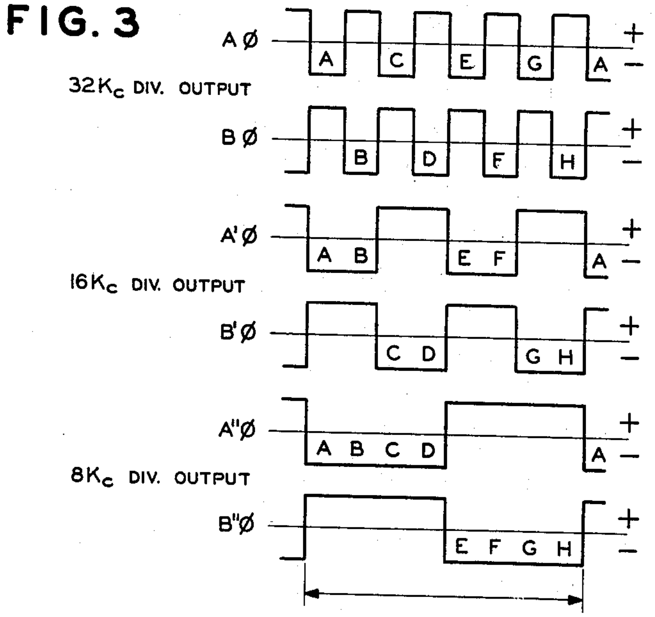
Fig. 3 is a set of curves for explaining the operation of the distributor of Fig. 2.

The conduction time intervals for each of the eight channels is indicated in Fig. 3 by the letters A through H. The grid connections for the associated keying tubes for all eight channels necessary to provide these conduction intervals can readily be determined from Fig. 3 by noting the square wave outputs associated with the channel letters.

Sending distributor 10 comprises eight amplifier tubes similar to tubes Va and Ve, each provided with three keying tubes so connected to frequency dividers 14, 15 and 16 that the intelligence signal from each channel is applied to synchronous gate 20 for one-eighth of each cycle of the 8 kc. square wave. In other words, the intelligence signal from each channel is sampled 8000 times per second, each sampling lasting approximately 1/64 millisecond.

Figure 2:
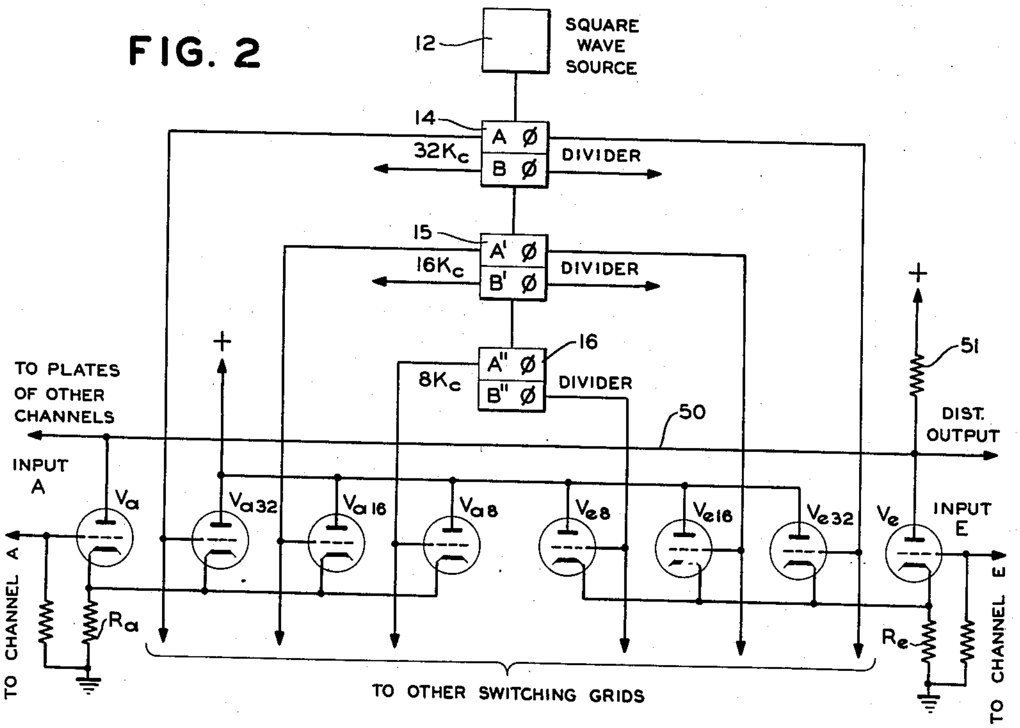
Fig. 2 illustrates one arrangement for the transmitting and receiving distributors of Fig. 1.

The circuit of Fig. 2 could be used for receiving distributor 30 by applying the output of synchronous gate 29 to the grids of all the amplifier tubes and by deriving the channel output signals from the anodes of the associated amplifier tubes. In this case, conductor 50 would interconnect the control grids of the amplifier tubes rather than the anodes thereof.

Figure 4:
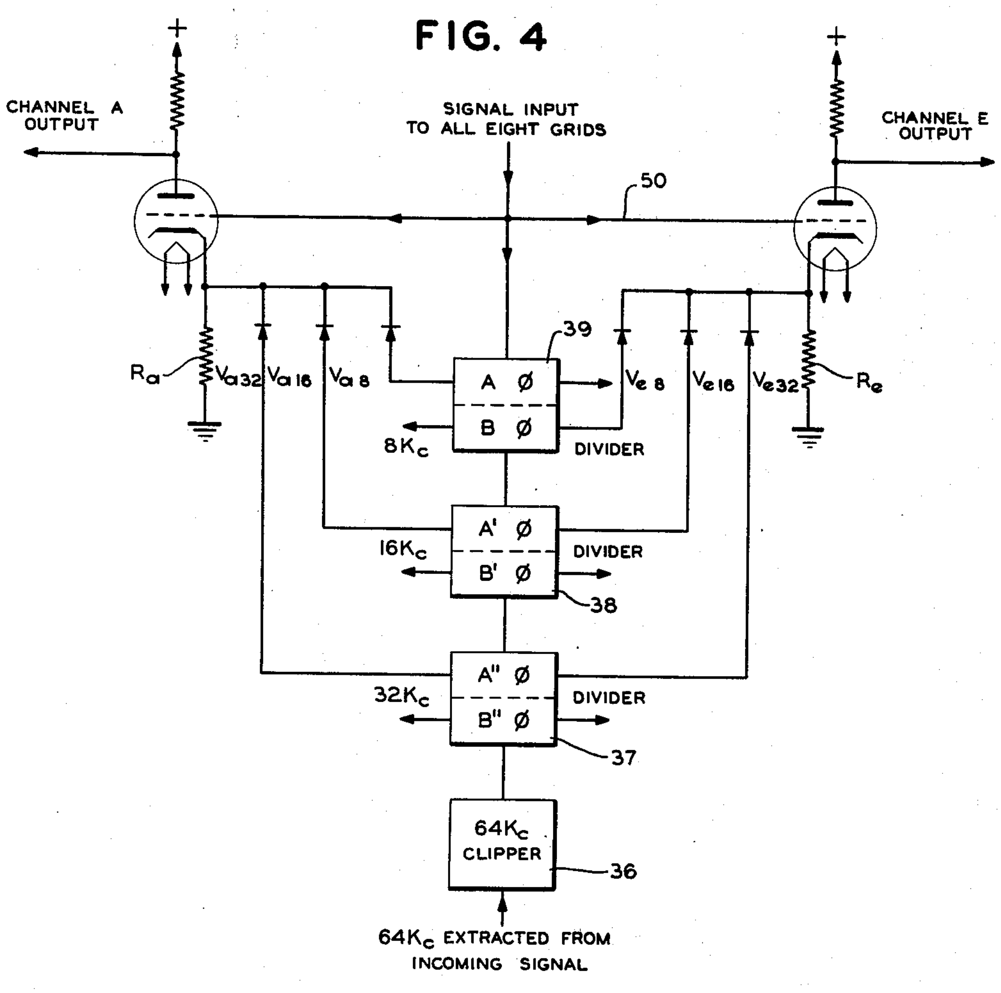
Fig. 4 shows another arrangement for the transmitting and receiving distributors of Fig. 1.

The keying tubes in either the sending or receiving distributor could conveniently be replaced by unilateral conductors, such as crystal rectifiers, poled so as to pass current through the associated amplifier tube cathode resistors when a positive square wave voltage is applied thereto. Such a circuit, arranged as a receiving distributor, is illustrated in Fig. 4. The circuit of Fig. 4 corresponds to that of Fig. 2, except that the keying tubes have been replaced with rectifiers, the control grids of the distributing tubes have been interconnected, and the distributing tubes have been individually coupled to the source of operating potential.

However, before describing the operation of the receiver in detail, it would be well to note that the signal pulses leaving the sending distributor are not suitable for transmission. In the first instance, the pulses are too wide so that transmission over a medium having a restricted bandwidth would result in further broadening and consequent inter-channel crosstalk. Secondly, the signal pulses do not all have the same shape and so will each be subjected to a different modification by the transmission medium. In order to obviate these difficulties, the signal pulses are passed through a synchronous gate 20 operated at 64 kc. The gate serves the dual function of slicing or selecting a small portion of each pulse for transmission and introducing a small 64 kc. component into the signal.

Figure 5:
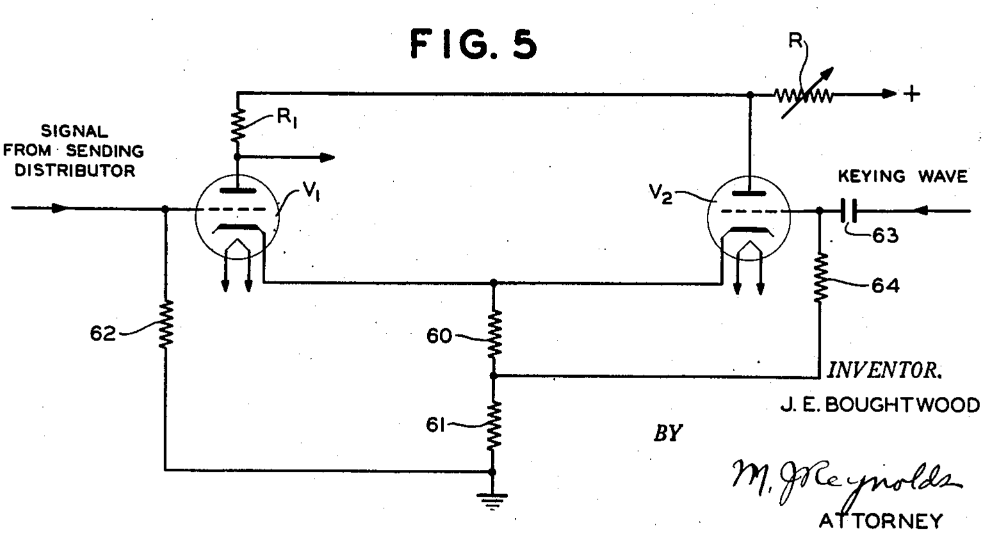
Fig. 5 shows a suitable circuit for the synchronous gate of Fig. 2.

Fig. 5, which illustrates in detail synchronous gate 20, comprises two electron discharge tubes V1 and V2. The cathodes of tubes V1 and V2 are interconnected and coupled to ground through two series connected resistors 60 and 61. The signal from sending distributor 10 is applied to the control grid of tube V1, which grid is coupled to ground through a resistor 62. A 64 kc. keying square wave from amplifier 13 is applied to the control grid of tube V2 through a capacitor 63. A resistor 64 intercouples the control grid of tube V2 and the junction of resistors 60 and 61. The anode of tube V1 is coupled to a source of positive potential through an anode resistor R1 and a variable resistor R. The anode of tube V2 is connected to the junction of resistors R and R1.

The amplitude of the 64 kc. keying wave applied to the control grid of tube V2 is sufficiently large so that, when positive, the cathode current of tube V2 will develop a sufficiently large voltage drop across resistors 60 and 61 to bias tube V1 beyond cut-off. When the keying wave is negative, tube V2 is cut off and tube V1 operates as a normal amplifier. Adjustment of the phase of the keying wave will vary the relative position of the portion of the signal pulse that is sliced. Adjustment of the durations of the positive and negative parts of the keying wave will vary the portion of the signal wave that is sliced. The plate currents of tubes V1 and V2 will each contain 64 kc. components. As these components will be substantially 180° out of phase, they can be subtracted to control the magnitude and phase of the 64 kc. component in the output signal. This control may be accomplished by varying the value of resistor R.

Figure 6:
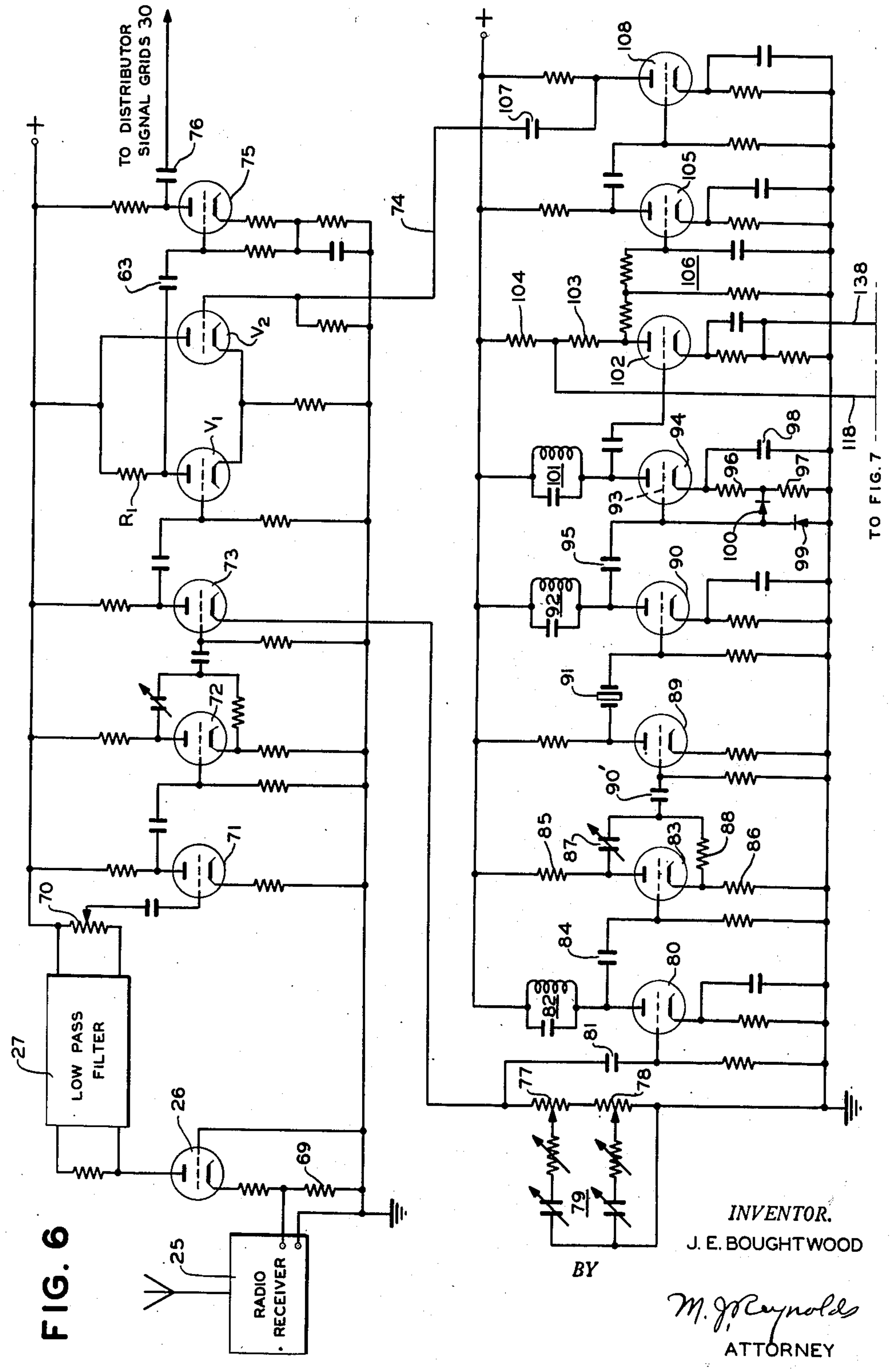
Figs. 6 and 7 show in detail the phasing circuits for the receiving station of Fig. 1.
Figure 7:
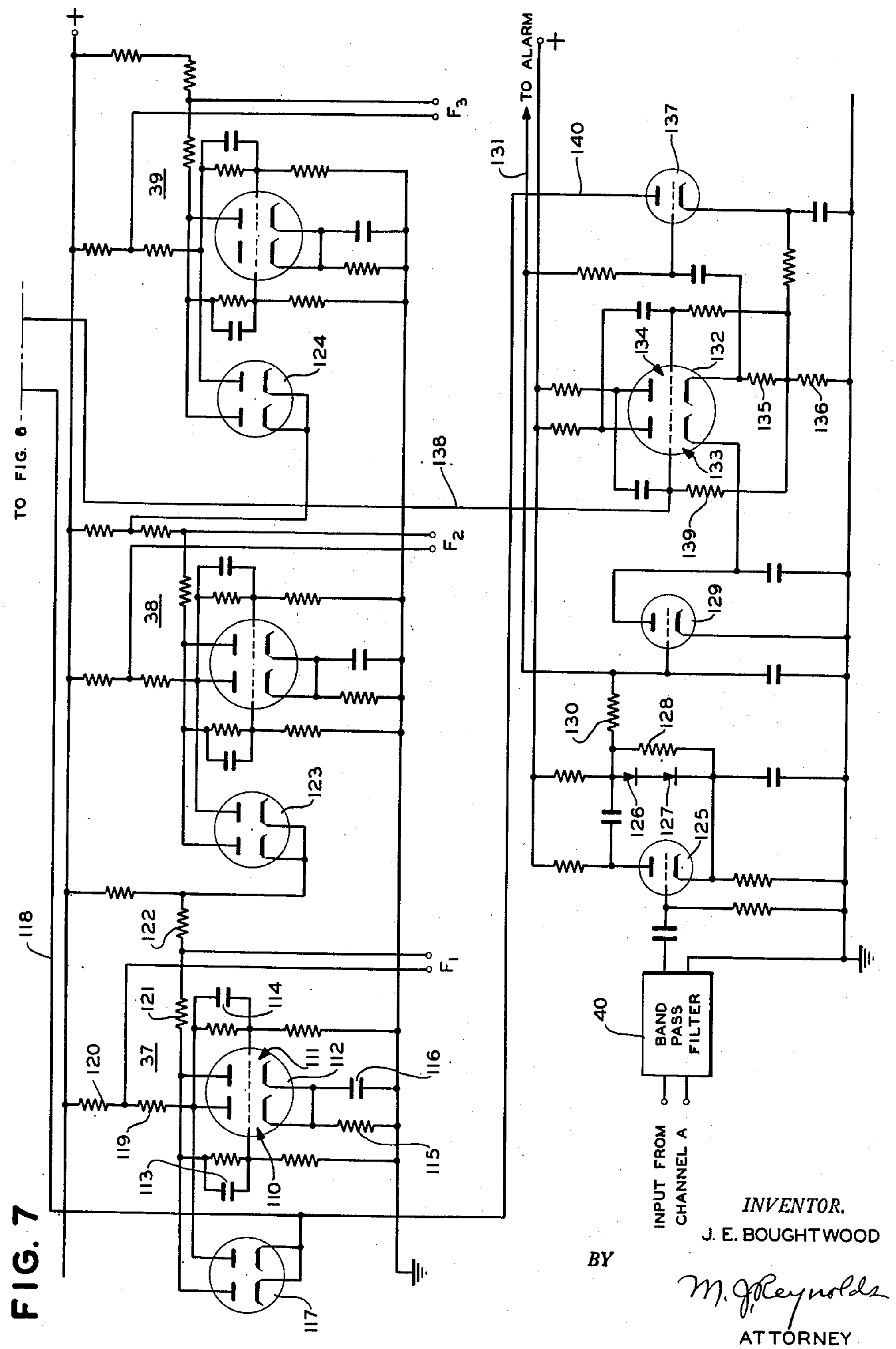

Referring now to Figs. 6 and 7, the output of radio receiver 25 is applied to amplifier tube 26. Tube 26 is arranged as a grounded grid amplifier so that the impedance presented to the transmission line from receiver 25 may properly be adjusted by properly selecting the value of a resistor 69 in the cathode circuit of tube 26. The output of amplifier 26 is applied to low pass filter 27. Filter 27 is preferably realized as a linear phase characteristic filter.

The output of filter 27 is derived from a potentiometer 70 and applied to the control grid of an amplifier tube 71. The output of amplifier tube 71 is applied to the control grid of a tube 72. Tube 72, together with tube 73 and their associated circuit elements constitute a pulse shaper of the type fully disclosed in my copending application referred to hereinbefore. The output of the pulse shaper is applied to the control grid of tube V1. Tubes V1 and V2 constitute a synchronous gating circuit of the type described hereinbefore in connection with Fig. 5. The 64 kc. square wave keying pulses are applied to the control grid of tube V2 through a conductor 74. The gating circuit is preferably adjusted to slice a portion in the middle of the signal pulses. The output of the gating circuit is applied to the control grid of an amplifier tube 75 through coupling capacitor 63. The amplified output of tube 75 is applied to the signal grids of the amplifier tubes of receiving distributor 30 through a coupling capacitor 76.

The cathode of tube 73 is coupled to ground through a pair of series connected potentiometers 77 and 78. Potentiometers 77 and 78, which form part of a shaping network 79, also serve as cathode follower impedances for tube 73 to apply the output thereof to the control grid of an amplifier tube 80 through a coupling capacitor 81. Tube 80 has an output impedance network 82 tuned to a frequency of 64 kc. The output of tube 80 is applied to the control grid of a phase adjuster tube 83 through a coupling capacitor 84. Tube 83 has substantially equal anode and cathode resistors 85 and 86, respectively. The output of tube 83 is derived from both the anode and cathode through a capacitor 87 and a resistor 88, respectively. Since the signal voltages at the anode and cathode are substantially 180° out of phase, adjustment of capacitor 87 will shift the phase of the resultant output applied to the control grid of a driver amplifier tube 89 through a coupling capacitor 90′.

The output of tube 89 is applied to the control grid of an amplifier tube 90 through a crystal 91. Crystal 91 acts as a very sharply tuned band pass filter tuned to a frequency of 64 kc. The anode impedance of tube 90 is constituted by a network 92 tuned to 64 kc. The output of amplifier tube 90 is applied to a control grid 93 of a clipper tube 94 through a coupling capacitor 95. The cathode of tube 94 is coupled to ground through a pair of series connected resistors 96 and 97 and a by-pass capacitor 98. Control grid 93 is coupled to ground through a rectifier 99 and to the junction of resistors 96 and 97 through a rectifier 100. Rectifiers 99 and 100 are so poled as to clip both polarities of the 64 kc. signal applied to grid 93. The anode impedance of tube 94 is constituted by a network 101 tuned to 64 kc. The output of tube 94 is applied to the control grid of tube 102 which is operated as an overdriven amplifier to produce a substantially square wave output signal. The anode of tube 102 is connected to a source of positive potential through two series connected resistors 103 and 104. The anode of tube 102 is also coupled to the control grid of another overdriven amplifier tube 105 through an integrating network 106. The output of tube 105 is given the proper wave shape for serving as the 64 kc. input of the gating circuit by adjusting the clipping action of the overdriven amplifier 105. The output of tube 105 is amplified and inverted by a gate driver tube 108. The anode of tube 108 is coupled to the control grid of tube V2 through a capacitor 107 and conductor 74.

In Fig. 7 there are shown three frequency divider stages 37, 38 and 39 adapted to provide square wave output voltages of 32 kc., 16 kc. and 8 kc., respectively.

Stage 37 comprises two triode discharge systems 110 and 111. The grid of system 110 is connected to the anode of system 111 included within a tube 112 through a network 113. Similarly, the grid of system 111 is connected to the anode of system 110 through a network 114. The cathode of systems 110 and 111 are interconnected and coupled to ground through a biasing resistor 115 and a by-pass capacitor 116. The anodes of systems 110 and 111 are connected, respectively, to the anodes of a dual diode tube 117. The cathodes of tube 117 are interconnected and connected through a conductor 118 to the junction of resistors 103 and 104 in the anode circuit of overdriven amplifier tube 102.

The 64 kc. square wave output of tube 102 controls the switching operations of systems 110 and 111 resulting from their multivibrator connection. Each complete 64 kc. cycle applied to the cathodes of tube 117 produces a single switching action of systems 110 and 111, so that a half cycle at 32 kc. is produced at output terminals F1. Terminals F1 are connected respectively to the junction of resistors 119 and 120 in the anode circuit of system 110 and the junction of resistors 121 and 122 in the anode circuit of system 111.

Stages 38 and 39 are each connected in the same manner as stage 37, except that the square wave control input for stage 38 is applied to double diode 123 thereof from the anode circuit of system 111, while the square wave control input for stage 39 is applied to double diode 124 thereof from stage 38.

The square wave outputs at terminals F2 and F3 are 16 kc. and 8 kc., respectively. Since the voltage to ground at each of the frequency output terminals of the respective pairs F1, F2 and F3 are substantially 180° out of phase with respect to each other, these terminal to ground voltages may be used as the inputs $A\phi$, $B\phi$, $A'\phi$, $B'\phi$, $A''\phi$ and $B''\phi$ for receiving distributor 30.

The output of detector amplifier 31A of Fig. 1, which constitutes the channel A signal, is applied to band pass filter 40 of Fig. 7. Filter 40 is designed to accept substantially solely the 4 kc. phasing signal added to the output of low pass filter 11A of Fig. 1.

The output of filter 40 is applied to the control grid of an amplifier tube 125. The output of tube 125 is rectified by a pair of rectifier elements 126 and 127 intercoupling the anode and cathode electrodes of tube 125. The rectified voltage developed across a load resistor 128 is applied as a biasing potential to the control grid of a tube 129 through a resistor 130. When a 4 kc. signal is present in channel A, the bias voltage developed across resistor 128 will cut off tube 129. When no 4 kc. signal is present in channel A, which occurs when the system is not properly phased, tube 129 will be conductive. The bias voltage developed across resistor 128 is also applied, through resistor 130 and a conductor 131, to an alarm circuit responsive to the absence of a voltage on conductor 131. Lack of phasing will therefore result in an audible or visual indication to operating personnel.

Tube 132 comprises two triode discharge systems 133 and 134 coupled together in free running multivibrator arrangement. The multivibrator may oscillate at any relatively low frequency. In a preferred embodiment of the invention, 100 cycles per second was chosen as the multivibrator frequency.

The cathode of discharge system 134 is coupled to ground through a series network comprising resistors 135 and 136. The cathode of discharge system 133 is coupled to ground through the discharge path of triode 129. Therefore, if triode 129 is rendered nonconductive by the bias voltage applied thereto, discharge system 133 will have no cathode return and hence will be nonconductive. If discharge system 133 is nonconductive, no multivibrator switching action can occur.

The multivibrator output is taken from the cathode of discharge system 134 which is coupled to the control grid of tube 137. A 64 kc. synchronizing signal is superimposed on the grid of multivibrator tube 133. This 64 kc. signal is derived from the cathode circuit of overdriven amplifier tube 102 and is applied to the grid of tube 133 through a conductor 138.

The output of tube 137, which comprises the 100 cycle oscillation is applied to the cathodes of double diode 117 through a conductor 140.

When the multivibrator oscillations are not suppressed by the biasing potential applied to tube 129, i. e., when the system is not properly phased, the output of tube 137 will provide short pulses to double diode 117 at a frequency of 100 cycles. These pulses will occur at a slight phase displacement from the normal 64 kc. signal applied to double diode 117 through conductor 118. The 64 kc. present in the input of tube 133 will cause the time of each pulse to be closely correlated with the 64 kc. signal from conductor 118. The pulse provided approximately every 640 cycles of the 64 kc. will cause an additional operation of frequency divider 37. As a result, a periodic skipping action is produced whereby receiving distributor 30 will effectively commutate two channels in the time normally consumed for commutating one channel. This abnormal commutation will occur at a frequency of 100 cycles, or every .01 second until proper phasing is achieved. Obviously, phasing will be achieved in a maximum of 7 additional commutations because, if the 4 kc. signal were present in channel B, 7 additional commutations would place it in channel A, cutting off the multivibrator and returning distributor operation to normal. If the 4 kc. signal were initially present in any of channels C through H, a shorter time would be required for phasing to occur.

The grid of tube 137 is also coupled to alarm voltage conductor 131 so that tube 137 will be cut off when the 4 kc. signal is present in channel A, thereby preventing any reaction upon frequency divider 37.

It should be remembered that the frequencies used in description of the system are given solely for purposes of illustration. as many other frequencies and frequency relationships could be employed.

While the invention has been described in a particular embodiment thereof and in a particular use, it is not desired that it be limited thereto, for obvious modifications thereof will occur to those skilled in the art without departing from the spirit and scope of the invention as set forth in the appended claims.

What is claimed is:

1. A multi-channel pulse modulation system, comprising an electronic sending distributor for successively sampling the intelligence signals from the transmitting channels, a source of a phasing signal, means to combine said phasing signal and the intelligence signal from a selected one of said transmitting channels to form a composite signal, means to apply said intelligence signals including said composite signal to said sending distributor, an electronic receiving distributor for successively applying said samples to the respective receiving channels at a predetermined commutation rate corresponding to said transmitting channels for substantially equal time intervals, means to transmit the successive samples of said intelligence signals to said receiving distributor, commutation varying means to cause said predetermined commutation rate to skip at a predetermined rate to commutate a number of said receiving channels different than one in one of said time intervals, means coupled to the receiving channel corresponding to said selected transmitting channel to derive therefrom said composite signal and to separate said phasing signal from said composite signal, and means to apply said separated phasing signal to said commutation variation means thereby to disable said commutation variation means.

2. A multi-channel pulse modulation system, comprising an electronic sending distributor for successively sampling intelligence signals lying within a given frequency band from the transmitting channels, a source of a characteristic frequency signal lying outside said given frequency band, means to combine said characteristic frequency signal and the intelligence signal from a selected one of said transmitting channels to form a composite signal, means to apply said intelligence signals including said composite signal to said sending distributor, an electronic receiving distributor for successively applying said samples to the respective receiving channels corresponding to said transmitting channels for substantially equal time intervals, means to transmit the successive samples of said intelligence signals to said receiving distributor, means periodically to cause said receiving distributor to skip at a rate substantially lower than the distributing rate thereof to periodically commutate at least two of said receiving channels in one of said time intervals, band pass filter means coupled to the receiving channel corresponding to said selected transmitting channel to derive therefrom said composite signal and to separate said characteristic frequency signal from said composite signal, and means to apply said separated characteristic frequency signal to said skipping means thereby to disable said skipping means.

3. A multi-channel pulse modulation system, comprising an electronic sending distributor for successively sampling the intelligence signals from the transmitting channels, a source of a characteristic frequency signal, means to combine said characteristic frequency signal and the intelligence signal from a selected one of said transmitting channels to form a composite signal, means to apply said intelligence signals including said composite signal to said sending distributor, an electronic receiving distributor for successively applying said samples to the respective receiving channels corresponding to said transmitting channels for substantially equal time intervals, means to transmit the successive samples of said intelligence signals to said receiving distributor, means to generate periodic skipping pulses, means to apply said skipping pulses to said receiving distributor thereby to cause said receiving distributor periodically to commutate at least two of said receiving channels in one of said time intervals, means coupled to the receiving channel corresponding to said selected transmitting channel to derive therefrom said composite signal and to separate said characteristic frequency signal from said composite signal, and means to apply said separated characteristic frequency signal to said skipping pulse generating means thereby to disable said skipping pulse generating means.

4. A multi-channel pulse modulation system, comprising an electronic sending distributor for successively sampling the intelligence signals from the transmitting channels, a source of a characteristic frequency signal, means to combine said characteristic frequency signal and the intelligence signal from a selected one of said transmitting channels to form a composite signal, means to apply said intelligence signals including said composite signal to said sending distributor, an electronic receiving distributor for successively applying said samples to the respective receiving channels corresponding to said transmitting channels for substantially equal time intervals, means to transmit the successive samples of said intelligence signals to said receiving distributor, multivibrator means for generating periodic skipping pulses, means to apply said skipping pulses to said receiving distributor thereby to cause said receiving distributor periodically to commutate at least two of said receiving channels in one of said time intervals, band pass filter means coupled to the receiving channel corresponding to said selected transmitting channel to derive therefrom said composite signal and to separate said characteristic frequeny signal from said composite signal, disabling means coupled to said multivibrator means, and means to apply said separated characteristic frequency signal to said disabling means thereby to disable said multivibrator means.

5. A multichannel pulse modulation system, comprising an electronic sending distributor for successively sampling the intelligence signals from the transmitting channels, a source of a characteristic frequency signal, means to combine said characteristic frequency signal and the intelligence signal from a selected one of said transmitting channels to form a composite signal, means to apply said intelligence signals including said composite signal to said sending distributor, an electronic receiving distributor for successively applying said samples to the respective receiving channels at a predetermined commutation rate corresponding to said transmitting channels for substantially equal time intervals, means to transmit the successive samples of said intelligence signals to said receiving distributor, commutation varying means to cause said predetermined commutation rate to skip at a periodic rate thereby to commutate at least two of said receiving channels in one of said time intervals, means coupled to the receiving channel corresponding to said selected transmitting channel to derive therefrom said composite signal and to separate said characteristic frequency signal from said composite signal, means to apply said separated characteristic frequency signal to said commutation varying means thereby to disable said commutation varying means, and alarm means coupled to said advancing means and responsive to the absence of said characteristic frequency signal in said receiving channel corresponding to said selected transmitting channel to produce an alarm indication when said sending and receiving distributors are not properly phased.

6. In a multichannel pulse modulation system, a phased receiver arrangement comprising an electronic receiving distributor for successively applying at a predetermined commutation rate samples of a received signal to the receiving channels of said system for substantially equal time intervals, said received signal comprising a plurality of intelligence signals each intended for a respective one of said receiving channels and a phasing signal added to a selected one of said intelligence signals, multivibrator means arranged to periodically to cause said receiving distributor to skip thereby to commutate at least two of said receiving channels in one of said time intervals, disabling means responsive to said phasing signal for disabling said multivibrator means, means coupled to the receiving channel corresponding to said selected intelligence signal to derive therefrom said phasing signal, and means to apply said phasing signal to said disabling means thereby to suppress said periodic skipping of said receiving distributor.

7. In a multichannel pulse modulation system, a phased receiver arrangement comprising an electronic receiving distributor for successively applying samples of a received signal to the receiving channels of said system for substantially equal time intervals, said received signal comprising a plurality of intelligence signals each intended for a respective one of said receiving channels and a characteristic frequency signal added to a selected one of said intelligence signals, means periodically to advance said receiving distributor thereby to commutate at least two of said receiving channels in one of said time intervals, said advancing means comprising a pair of electron discharge systems coupled together in free running multivibrator arrangement and arranged periodically to supply stepping pulses to said receiving distributor, means comprising a third normally conductive electron discharge system interposed in the cathode circuit of one of said pair of discharge systems for disabling said advancing means, means coupled to the receiving channel corresponding to said selected intelligence signal to derive therefrom said characteristic frequency signal, and means to apply said characteristic frequency signal to said third electron discharge system in a sense to render said third discharge system nonconductive thereby to suppress said periodic advancing of said receiving distributor.

8. In a multichannel pulse modulation system, a phased receiver arrangement comprising an electronic receiving distributor for successively applying samples of a received signal to the receiving channels of said system for substantially equal time intervals, said received signal comprising a plurality of intelligence signals lying within a given frequency range and each intended for a respective one of said receiving channels and a characteristic frequency signal lying outside said given range and added to a selected one of said intelligence signals, means periodically to advance said receiving distributor thereby to commutate at least two of said receiving channels in one of said time intervals, said advancing means comprising a pair of electron discharge systems coupled together in free running multivibrator circuit arrangement and arranged periodically to supply stepping pulses to said receiving distributor, means comprising a third normally conductive electron discharge system interposed in the cathode circuit of one of said pair of discharge systems for disabling said advancing means, band pass filter means coupled to the receiving channel corresponding to said selected intelligence signal to derive therefrom said characteristic frequency signal, and means comprising a rectifier circuit coupled to said band pass filter to apply said characteristic frequency signal to said third discharge system in a sense to render said third discharge system non-conductive thereby to suppress said periodic advancing of said receiving distributor.

9. In a multichannel pulse modulation system, a phased receiver arrangement comprising an electronic receiving distributor for successively applying samples of a received signal to the receiving channels of said system for substantially equal time intervals, said received signal comprising a plurality of intelligence signals each intended for a respective one of said receiving channels and a characteristic frequency signal added to a selected one of said intelligence signals, means periodically to cause said receiving distributor to skip thereby to commutate at least two of said receiving channels in one of said time intervals, disabling means responsive to said characteristic frequency signal for disabling said periodic skipping means, means coupled to the receiving channel corresponding to said selected intelligence signal to derive therefrom said characteristic frequency signal, means to apply said characteristic frequency signal to said disabling means thereby to suppress said periodic skipping of said receiving distributor, and means responsive to the absence of said characteristic frequency signal in the receiving channel corresponding to said selected intelligence signal to provide an alarm indication when said receiving distributor is not properly phased with respect to said intelligence signals.

JOHN E. BOUGHTWOOD.

References Cited in the file of this patent

UNITED STATES PATENTS

| Number | Name | Date |
|---|---|---|
| 2,418,116 | Grieg | Apr. 1, 1947 |
| 2,490,039 | Earep | Dec. 6, 1949 |
| 2,527,638 | Keer | Oct. 31, 1950 |
| 2,527,650 | Peterson | Oct. 31, 1950 |